US009200965B2

United States Patent
Gurary et al.

(10) Patent No.: US 9,200,965 B2
(45) Date of Patent: Dec. 1, 2015

(54) TEMPERATURE CONTROL FOR GAN BASED MATERIALS

(71) Applicant: Veeco Instruments Inc., Plainview, NY (US)

(72) Inventors: Alexander I. Gurary, Bridgewater, NJ (US); Mikhail Belousov, Plainsboro, NJ (US); Guray Tas, Flanders, NJ (US)

(73) Assignee: Veeco Instruments Inc., Plainview, NY (US)

( * ) Notice: Subject to any disclaimer, the term of this patent is extended or adjusted under 35 U.S.C. 154(b) by 318 days.

(21) Appl. No.: 13/801,357

(22) Filed: Mar. 13, 2013

(65) Prior Publication Data

US 2013/0343426 A1 Dec. 26, 2013

Related U.S. Application Data

(60) Provisional application No. 61/664,374, filed on Jun. 26, 2012.

(51) Int. Cl.
*G01J 5/02* (2006.01)
*G01J 5/00* (2006.01)
*G01J 5/60* (2006.01)

(52) U.S. Cl.
CPC ............... *G01J 5/02* (2013.01); *G01J 5/0007* (2013.01); *G01J 5/602* (2013.01)

(58) Field of Classification Search
CPC ........... G01J 5/02; G01J 5/602; G01J 5/0007; H01L 21/205; H01L 21/66; H01L 21/02; C23C 16/52; C30B 29/40
USPC .......................................................... 374/121
See application file for complete search history.

(56) References Cited

U.S. PATENT DOCUMENTS 4,854,727 A * 8/1989 Pecot et al. ..................... 374/57
5,156,461 A * 10/1992 Moslehi et al. ............... 374/121

(Continued)

FOREIGN PATENT DOCUMENTS

DE 102007042779 A1 4/2009
KR 20110077462 A 7/2011

(Continued)

OTHER PUBLICATIONS

STIC Search Report, B. Martin, Mar. 6, 2015, all pages.*

(Continued)

*Primary Examiner* — Lisa Caputo
*Assistant Examiner* — Philip Cotey
(74) *Attorney, Agent, or Firm* — Lerner, David, Littenberg, Krumholz & Mentlik, LLP

(57) ABSTRACT

A method of in-situ temperature measurement for a wafer treatment reactor such as a chemical vapor deposition reactor desirably includes the steps of heating the reactor until the reactor reaches a wafer treatment temperature and rotating a wafer support element within the reactor about a rotational axis. The method desirably further includes, while the wafer support element is rotating about the rotational axis, obtaining first operating temperature measurements using a first operating pyrometer that receives radiation from a first portion of the wafer support element, and obtaining first wafer temperature measurements using a wafer temperature measurement device that receives radiation from at least one wafer, the wafer temperature measurement device located at a first position.

20 Claims, 1 Drawing Sheet

(56) References Cited

U.S. PATENT DOCUMENTS

| | | | |
|---|---|---|---|
| 5,255,286 A * | 10/1993 | Moslehi et al. | 374/121 |
| 5,305,417 A * | 4/1994 | Najm et al. | 392/418 |
| 5,790,750 A | 8/1998 | Anderson | |
| 6,191,399 B1 * | 2/2001 | Van Bilsen | 219/497 |
| 6,349,270 B1 | 2/2002 | Gurary et al. | |
| 6,492,625 B1 | 12/2002 | Boguslavskiy et al. | |
| 6,818,894 B2 | 11/2004 | Takoudis et al. | |
| 7,275,861 B2 * | 10/2007 | Volf et al. | 374/1 |
| 7,276,124 B2 | 10/2007 | Gurary et al. | |
| 8,888,360 B2 * | 11/2014 | Gurary et al. | 374/2 |
| 2002/0173127 A1 * | 11/2002 | Wang et al. | 438/542 |
| 2003/0236642 A1 | 12/2003 | Timans | |
| 2006/0171442 A1 | 8/2006 | Volf et al. | |
| 2007/0077355 A1 * | 4/2007 | Chacin et al. | 427/248.1 |
| 2007/0291816 A1 * | 12/2007 | Volf et al. | 374/1 |
| 2008/0141556 A1 * | 6/2008 | Sorabji et al. | 34/380 |
| 2009/0155028 A1 | 6/2009 | Boguslavskiy et al. | |
| 2009/0289053 A1 * | 11/2009 | Ranish et al. | 219/522 |
| 2012/0170609 A1 * | 7/2012 | Gurary et al. | 374/2 |
| 2012/0221138 A1 * | 8/2012 | Hong | 700/108 |

FOREIGN PATENT DOCUMENTS

| | | |
|---|---|---|
| KR | 20120062921 A | 6/2012 |
| WO | 0226435 A1 | 4/2002 |

OTHER PUBLICATIONS

International Search Report and Written Opinion for PCT/US2011/066831 dated Apr. 12, 2012.
Written Opinion of the International Preliminary Examining Authority for Application No. PCT/US2011/066831 dated Jan. 8, 2013.
International Search Report and Written Opinion for Application No. PCT/US2013/047010 dated Sep. 27, 2013.
Taiwan Office Action for Application No. 100149858 dated Dec. 18, 2013.

* cited by examiner

TEMPERATURE CONTROL FOR GAN BASED MATERIALS

CROSS-REFERENCE TO RELATED APPLICATION

The present application claims the benefit of the filing date of U.S. Provisional Patent Application No. 61/664,374 filed Jun. 26, 2012, the disclosure of which is hereby incorporated herein by reference.

BACKGROUND OF THE INVENTION

The present invention relates to wafer processing apparatus, to temperature measurement and control systems for use in such processing apparatus, and to methods of in-situ temperature measurement and control.

Many semiconductor devices are formed by processes performed on a substrate. The substrate typically is a slab of a crystalline material, commonly referred to as a "wafer." Typically, a wafer is formed by growing a large crystal and slicing the crystal into the shape of a disc. One common process performed on such a wafer is epitaxial growth.

For example, devices formed from compound semiconductors such as III-V semiconductors typically are formed by growing successive layers of the compound semiconductor using metal organic chemical vapor deposition or "MOCVD." In this process, the wafers are exposed to a combination of gases, typically including a metal organic compound as a source of a group III metal, and also including a source of a group V element which flow over the surface of the wafer while the wafer is maintained at an elevated temperature. Typically, the metal organic compound and group V source are combined with a carrier gas which does not participate appreciably in the reaction as, for example, nitrogen. One example of a III-V semiconductor is gallium nitride, which can be formed by reaction of an organo gallium compound and ammonia on a substrate having a suitable crystal lattice spacing, as for example, a sapphire wafer. Typically, the wafer is maintained at a temperature on the order of 500-1100° C. during deposition of gallium nitride and related compounds.

Composite devices can be fabricated by depositing numerous layers in succession on the surface of the wafer under slightly different reaction conditions, as for example, additions of other group III or group V elements to vary the crystal structure and bandgap of the semiconductor. For example, in a gallium nitride based semiconductor, indium, aluminum or both can be used in varying proportion to vary the bandgap of the semiconductor. Also, p-type or n-type dopants can be added to control the conductivity of each layer. After all of the semiconductor layers have been formed and, typically, after appropriate electric contacts have been applied, the wafer is cut into individual devices. Devices such as light-emitting diodes ("LEDs"), lasers, and other electronic and optoelectronic devices can be fabricated in this way.

In a typical chemical vapor deposition process, numerous wafers are held on a component commonly referred to as a wafer carrier so that a top surface of each wafer is exposed at the top surface of the wafer carrier. The wafer carrier is then placed into a reaction chamber and maintained at the desired temperature while the gas mixture flows over the surface of the wafer carrier. It is important to maintain uniform conditions at all points on the top surfaces of the various wafers on the carrier during the process. Minor variations in composition of the reactive gases and in the temperature of the wafer surfaces cause undesired variations in the properties of the resulting semiconductor devices.

For example, if a gallium indium nitride layer is deposited, variations in wafer surface temperature or concentrations of reactive gasses will cause variations in the composition and bandgap of the deposited layer. Because indium has a relatively high vapor pressure, the deposited layer will have a lower proportion of indium and a greater bandgap in those regions of the wafer where the surface temperature is higher. If the deposited layer is an active, light-emitting layer of an LED structure, the emission wavelength of the LEDs formed from the wafer will also vary. Thus, considerable effort has been devoted in the art heretofore towards maintaining uniform conditions.

One type of CVD apparatus which has been widely accepted in the industry uses a wafer carrier in the form of a large disc with numerous wafer-holding regions, each adapted to hold one wafer. The wafer carrier is supported on a spindle within the reaction chamber so that the top surface of the wafer carrier having the exposed surfaces of the wafers faces upwardly toward a gas distribution element. While the spindle is rotated, the gas is directed downwardly onto the top surface of the wafer carrier and flows across the top surface toward the periphery of the wafer carrier. The used gas is evacuated from the reaction chamber through exhaust ports disposed below the wafer carrier and distributed around the axis of the spindle, typically near the periphery of the chamber.

The wafer carrier is maintained at the desired elevated temperature by heating elements, typically electrical resistive heating elements disposed below the bottom surface of the wafer carrier. These heating elements are maintained at a temperature above the desired temperature of the wafer surfaces, whereas the gas distribution element typically is maintained at a temperature well below the desired reaction temperature so as to prevent premature reaction of the gases. Therefore, heat is transferred from the heating elements to the bottom surface of the wafer carrier and flows upwardly through the wafer carrier to the individual wafers.

In a conventional wafer treatment process, such as a chemical vapor deposition process or another operation using a rotating disc reactor for another purpose such as etching, the process temperature in the reaction chamber can be measured by one or more non-contact pyrometers that are adapted to measure the temperature of the wafer carrier and/or the wafers during processing. Such temperature measurements can be used as an input to help determine the control of the heating elements during processing of the wafers.

It is important to be able to determine the temperature of the wafers in a CVD reactor during wafer treatment cycles. High pyrometer repeatability across different CVD reactors can allow for the use of a single CVD process recipe across multiple reactors, greatly reducing production downtime that can occur if individual reactors have to be extensively tuned to produce consistent wafer characteristics among the reactors. A critical component of CVD reactor pyrometer repeatability is temperature-matching across multiple reactors, due to the high sensitivity of characteristics of the devices made in CVD reactors to the temperatures used in the CVD process. For example, where the devices made in the reactors are lasers or LEDs that include multiple quantum wells ("MQWs"), the wavelengths emitted by the MQWs are highly sensitive to the temperatures used in the CVD process. Consequently, it is necessary that pyrometers across multiple reactors bring the wafers in these reactors to the same wafer process temperatures.

However, it is typical to see a variation in measured temperatures across multiple pyrometers in a reactor or a facility, and even across multiple wafers in a single reactor. Even after calibration, pyrometers can have a spread of +/−3° C. due to variation in calibration of these black body furnaces, as well as instability and drift of the furnace over time, such that the actual temperature of the wafer carrier and the in-process wafers can become uncertain. Additional sources of pyrometer measured temperature variation can include variable installation of the pyrometers on the reactor, which can affect the pyrometer temperature reading, and drift of the pyrometer temperature reading output over time. Such measured temperature variations can make it difficult to use universal temperature control recipes on multiple MOCVD reactors, or even from process run to process run in the same reactor, and the resulting uncertainty may require individual reactor system tuning to bring multiple reactors to same temperature control behavior.

Although considerable effort has been devoted in the art heretofore to optimization of such systems, still further improvement would be desirable. In particular, it would be desirable to provide a temperature measurement system that can more accurately control the temperature of the wafers in a reactor.

SUMMARY OF THE INVENTION

A method of in-situ temperature measurement for a wafer treatment reactor, and an in-situ temperature measurement system for a wafer treatment reactor are provided. One aspect of the invention provides a method of in-situ temperature measurement for a wafer treatment reactor such as a chemical vapor deposition reactor. The method desirably includes the steps of heating the reactor until the reactor reaches a wafer treatment temperature and rotating a wafer support element within the reactor about a rotational axis. The method desirably further includes, while the wafer support element is rotating about the rotational axis, obtaining first operating temperature measurements using a first operating pyrometer that receives radiation from a first portion of the wafer support element, and obtaining first wafer temperature measurements using a wafer temperature measurement device that receives radiation from at least one wafer, the wafer temperature measurement device located at a first position.

In a particular embodiment, the first portion of the wafer support element can be located at a first radial distance from the rotational axis. While the wafer support element is rotating about the rotational axis, the radiation received by the wafer temperature measurement device from the at least one wafer can be received from locations at the first radial distance from the rotational axis. In one example, the wafer temperature measurement device can be a short wavelength pyrometer. In an exemplary embodiment, the wafer temperature measurement device can be one of: an absorption shift based device or a white light spectral reflectometer.

In one example, the first operating pyrometer can be sensitive to radiation in a first wavelength band, the wafer temperature measurement device can be sensitive to radiation in a second wavelength band, and the at least one wafer can be translucent or transparent to radiation in the first band and opaque to radiation in the second band. In a particular example, the first wavelength band can be in the infrared light spectrum, and the second wavelength band can be in the ultraviolet light spectrum. In a particular embodiment, the at least one wafer can consist essentially of sapphire. In an exemplary embodiment, the at least one wafer can be a plurality of wafers.

In a particular example, the steps of obtaining first operating temperature measurements and obtaining first wafer temperature measurements can be performed simultaneously. In one embodiment, the steps of obtaining first operating temperature measurements and obtaining first wafer temperature measurements can be performed during operation of the reactor to treat wafers. In an exemplary embodiment, the operation of the reactor to treat wafers can include chemical vapor deposition. In a particular embodiment, the heating step can be performed by a multi-zone heating system for the wafer support element, a first zone of the heating system having a portion thereof located at the first radial distance from the rotational axis. The method can also include the step of changing the temperature of the first zone.

In one example, the method can also include the steps of moving the wafer temperature measurement device to a second position and, while the wafer support element is rotating about the rotational axis, obtaining second operating temperature measurements using a second operating pyrometer that receives radiation from a second portion of the wafer support element. The method can also include the step of, while the wafer support element is rotating about the rotational axis, obtaining second wafer temperature measurements using the wafer temperature measurement device, the second wafer temperature measurements being at least partially based on radiation received from the at least one wafer.

In a particular embodiment, the second portion of the wafer support element can be located at a second radial distance from the rotational axis. While the wafer support element is rotating about the rotational axis, the radiation received by the wafer temperature measuring device from the at least one wafer can be received from locations at the second radial distance from the rotational axis. In one example, a second zone of the heating system can have a portion thereof located at the second radial distance from the rotational axis. The method can also include the step of changing the temperature of the second zone.

In an exemplary embodiment, the wafer temperature measurement device can be engaged in a radially-extensive optical viewport, and the moving step can be performed such that the wafer temperature measurement device is moved along the radially-extensive calibrating optical viewport from the first position to the second position. In one embodiment, the moving step can be performed such that the wafer temperature measurement device is moved along a linear slide. In a particular example, the first wafer temperature measurements can be at least partially based on radiation received from a first wafer of the at least one wafer, and the second wafer temperature measurements can be at least partially based on radiation received from a second wafer of the at least one wafer.

In one embodiment, the wafer treatment temperature can be a first wafer treatment temperature. The method can also include the steps of heating the reactor until the reactor reaches a second wafer treatment temperature, and, while the wafer support element is rotating about the rotational axis, obtaining second operating temperature measurements from the first portion of the wafer support element using the first operating pyrometer. The method can also include the step of, while the wafer support element is rotating about the rotational axis, obtaining second wafer temperature measurements from the at least one wafer using the wafer temperature measurement device.

Another aspect of the invention provides a method of in-situ temperature measurement for a wafer treatment reactor such as a chemical vapor deposition reactor. The method desirably includes the steps of heating the reactor until the reactor reaches a wafer treatment temperature, rotating a wafer support element bearing at least one wafer within the reactor about a rotational axis, and depositing a material overlying the top surface of the at least one wafer, the material forming a layer having a top surface thereof.

The method desirably further includes, while the wafer support element is rotating about the rotational axis, obtaining first operating temperature measurements using a first operating pyrometer sensitive to radiation in a first wavelength band, the first operating pyrometer receiving radiation from the top surface of at least one wafer, the at least one wafer being opaque to radiation in the first band, the layer overlying the top surface of the at least one wafer being translucent or transparent to radiation in the first band.

The method desirably further includes, while the wafer support element is rotating about the rotational axis, obtaining first wafer temperature measurements using a wafer temperature measurement device sensitive to radiation in a second wavelength band, the wafer temperature measurement device receiving radiation from the top surface of the layer overlying the top surface of the at least one wafer, the at least one wafer being opaque to radiation in the second band, the layer overlying the top surface of the at least one wafer being opaque to radiation in the second band, the wafer temperature measurement device located at a first position.

Yet another aspect of the invention provides a method of in-situ wafer temperature measurement device calibration for a wafer treatment reactor such as a chemical vapor deposition reactor. The method desirably includes the steps of positioning a calibrating pyrometer at a calibrating position so that the calibrating pyrometer is adapted to receive radiation from a portion of a first wafer support element at a first radial distance from a rotational axis of the first wafer support element, heating the reactor until the reactor reaches a pyrometer calibration temperature, and rotating the first wafer support element about the rotational axis.

The method desirably further includes, while the first wafer support element is rotating about the rotational axis, obtaining first operating temperature measurements from an operating pyrometer installed at an operating position so that the operating pyrometer is adapted to receive radiation from the portion of the first wafer support element at the first radial distance from the rotational axis of the first wafer support element. The method desirably further includes, while the support element is rotating about the rotational axis, obtaining first calibrating temperature measurements from the calibration pyrometer.

The method desirably further includes removing the calibrating pyrometer from the calibrating position, replacing the first wafer support element with a second wafer support element bearing at least one wafer thereon, the at least one wafer being opaque to the operating pyrometer and the wafer temperature measurement device, positioning the wafer temperature measurement device at the calibrating position so that the wafer temperature measurement device is adapted to receive radiation from the at least one wafer at the first radial distance from the rotational axis of the second wafer support element, and rotating the second wafer support element about the rotational axis.

The method desirably further includes, while the second support element is rotating about the rotational axis, obtaining second operating temperature measurements from the wafer temperature measurement device, the second operating temperature measurements including a temperature of a top surface of the at least one wafer. The method desirably further includes, while the second wafer support element is rotating about the rotational axis, obtaining second calibrating temperature measurements from the first operating pyrometer, the second calibrating temperature measurements including a temperature of the top surface of the at least one wafer.

Still another aspect of the invention provides an in-situ temperature measurement system for a wafer treatment reactor such as a chemical vapor deposition reactor. The system preferably includes a wafer support element having a rotational axis, a heating element for the wafer support element, a first operating pyrometer adapted to receive radiation from a first portion of the wafer support element at a first radial distance from the rotational axis, and a wafer temperature measurement device located at a first position. The wafer temperature measurement device in the first position can be adapted to receive radiation from at least one wafer disposed on the wafer support element at the first radial distance from the rotational axis.

In a particular embodiment, the wafer temperature measurement device can be a short wavelength pyrometer. In one example, the wafer temperature measurement device can be an absorption shift based device. In an exemplary embodiment, the first operating pyrometer can be sensitive to radiation in a first wavelength band, the wafer temperature measurement device can be sensitive to radiation in a second wavelength band, and the at least one wafer can be translucent or transparent to radiation in the first band and opaque to radiation in the second band.

In one embodiment, the first wavelength band can be in the infrared light spectrum, and the second wavelength band can be in the ultraviolet light spectrum. In a particular example, the first operating pyrometer and the wafer temperature measurement device can be adapted to simultaneously take temperature measurements at the first radial distance from the rotational axis of the wafer support element. In an exemplary embodiment, the heating element can be a multi-zone heating system for the wafer support element, and a first zone of the heating system can have a portion thereof located at the first radial distance from the rotational axis.

In a particular example, the system can also include a second operating pyrometer adapted to receive radiation from a second portion of the wafer support element at a second radial distance from the rotational axis. The temperature measurement device can be adapted to be located at a second position, and the wafer temperature measurement device in the second position can be adapted to receive radiation from the at least one wafer at the second radial distance from the rotational axis. In one embodiment, the wafer temperature measurement device can be engaged in a radially-extensive optical viewport, and the wafer temperature measurement device can be adapted to slide within the radially-extensive optical viewport between the first and second positions. In an exemplary embodiment, the system can also include a linear slide. The wafer temperature measurement device can be adapted to slide along the linear slide between the first and second positions.

DETAILED DESCRIPTION

Figure 1:
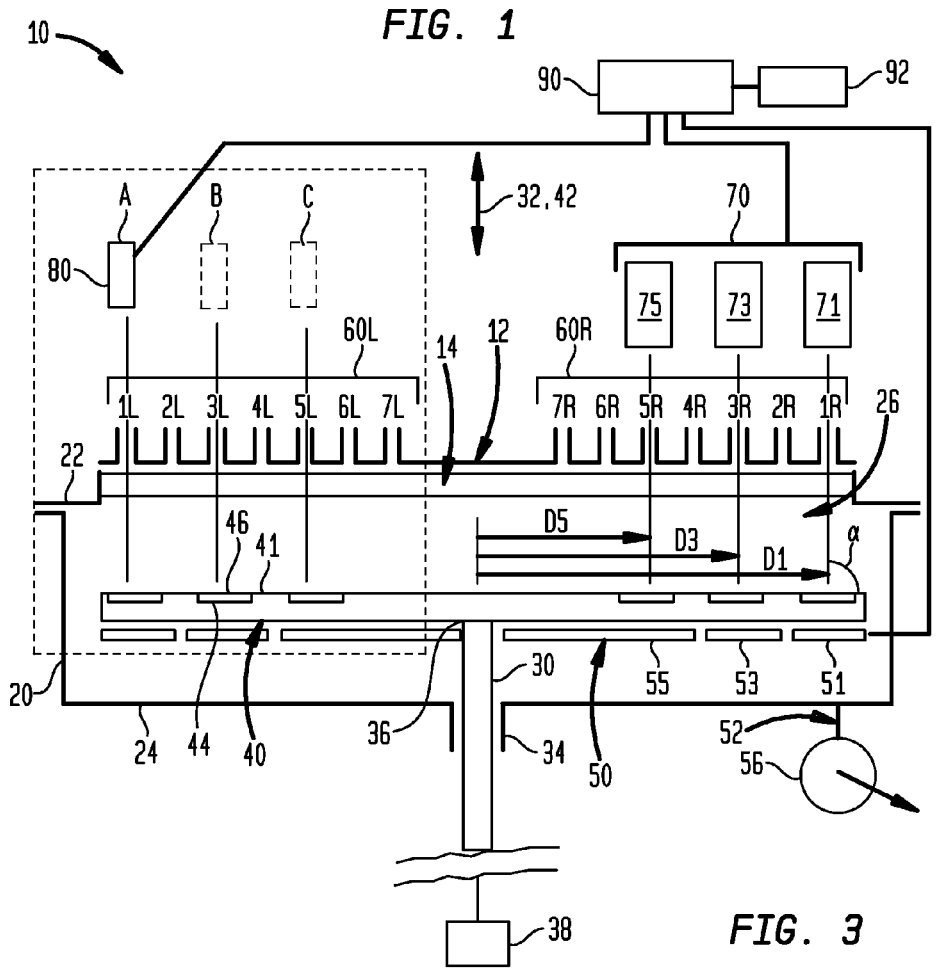
FIG. 1 is a sectional view depicting a chemical vapor deposition apparatus in accordance with one embodiment of the invention.

Referring to FIG. 1, a chemical vapor deposition apparatus 10 in accordance with one embodiment of the invention includes a reaction chamber 12 having a gas inlet manifold 14 arranged at one end of the chamber 12. The end of the chamber 12 having the gas inlet manifold 14 is referred to herein as the "top" end of the chamber 12. This end of the chamber typically, but not necessarily, is disposed at the top of the chamber in the normal gravitational frame of reference. Thus, the downward direction as used herein refers to the direction away from the gas inlet manifold 14; whereas the upward direction refers to the direction within the chamber, toward the gas inlet manifold 14, regardless of whether these directions are aligned with the gravitational upward and downward directions. Similarly, the "top" and "bottom" surfaces of elements are described herein with reference to the frame of reference of chamber 12 and manifold 14.

The chamber 12 has a cylindrical wall 20 that extends between a top flange 22 at the top end of the chamber and a base plate 24 at the bottom end of the chamber. The wall 20, the flange 22, and the base plate 24 define an air-tight sealed interior region 26 therebetween that can contain gasses emitted from the gas inlet manifold 14. Although the chamber 12 is shown as cylindrical, other embodiments can include a chamber having another shape, including, for example, a cone or other surface of revolution about a central axis 32, a square, a hexagon, an octagon, or any other appropriate shape.

The gas inlet manifold 14 is connected to sources for supplying process gases to be used in the wafer treatment process, such as a carrier gas and reactant gases such as a metalorganic compound and a source of a group V metal. In a typical chemical vapor deposition process, the carrier gas can be nitrogen, hydrogen, or a mixture of nitrogen and hydrogen, and hence the process gas at the top surface of a wafer carrier can be predominantly composed of nitrogen and/or hydrogen with some amount of the reactive gas components. The gas inlet manifold 14 is arranged to receive the various gases and direct a flow of process gasses generally in the downward direction.

The gas inlet manifold 14 can also be connected to a coolant system (not shown) arranged to circulate a liquid through the gas distribution element so as to maintain the temperature of the element at a desired temperature during operation. A similar coolant arrangement (not shown) can be provided for cooling the walls of the chamber 12.

The chamber 12 can also be provided with an entry opening (not shown) leading to an antechamber (not shown), and a moveable shutter (not shown) for closing and opening the entry opening. The shutter can be configured as disclosed, for example, in U.S. Pat. No. 7,276,124, the disclosure of which is hereby incorporated by reference herein.

A spindle 30 is arranged within the chamber so that the central axis 32 of the spindle 30 extends in the upward and downward directions. The spindle is mounted to the chamber by a conventional rotary pass-through device 34 incorporating bearings and seals (not shown) so that the spindle can rotate about the central axis 32, while maintaining a seal between the spindle 30 and the base plate 24 of the chamber 12. The spindle 30 has a fitting 36 at its top end, i.e., at the end of the spindle closest to the gas inlet manifold 14.

The spindle 30 is connected to a rotary drive mechanism 38 such as an electric motor drive, which is arranged to rotate the spindle about the central axis 32. The spindle 30 can also be provided with internal coolant passages extending generally in the axial directions of the spindle within the gas passageway. The internal coolant passages can be connected to a coolant source, so that a fluid coolant can be circulated by the source through the coolant passages and back to the coolant source.

A wafer carrier or wafer support element 40 is substantially in the form of a circular disc having a top surface 41 and a central axis 42. In the operative position shown in FIG. 1, the central axis 42 of the support element 40 is coincident with the axis 32 of the spindle. The support element 40 can be formed as a single piece or as a composite of plural pieces. For example, as disclosed in U.S. Published Patent Application No. 2009/0155028, the disclosure of which is hereby incorporated by reference herein, the support element 40 may include a hub defining a small region of the support element surrounding the central axis 42 and a larger portion defining the remainder of the disc-like body. In other embodiments (not shown), the support element 40 can have other shapes, including, for example, a square, a hexagon, or an octagon.

The support element 40 can be formed from materials that do not contaminate the CVD process and that can withstand the temperatures encountered in the process. For example, the larger portion of the support element 40 may be formed largely or entirely from materials such as graphite, silicon carbide, boron nitride, aluminum nitride, or other refractory materials. The support element 40 has generally planar upper and lower surfaces extending generally parallel to one another and generally perpendicular to the vertical rotational axis 42 of the support element. In one example, the support element 40 can be about 300 mm to about 700 mm in diameter.

The support element 40 can include platforms or recesses 44 arranged circumferentially about the support element, each such platform or recess being configured to removably receive a disc-like wafer 46 and to hold such wafer during a MOCVD process such as that described below. Each wafer 46 can be formed from a sapphire, silicon carbide, silicon, gallium nitride, or other crystalline substrate. Typically, each wafer 46 has a thickness that is small in comparison to the dimensions of its major surfaces. For example, a circular wafer about 2 inches (50 mm) in diameter may be about 430 μm thick or less. Each wafer 46 can disposed on or adjacent the support element 40 with a top surface thereof facing upwardly, so that the top surface of the wafer is exposed at the top surface 41 of the support element.

Some wafers 46, such as those made from sapphire substrates with GaN layers deposited on them during a CVD process, can be transparent to visible and infrared light, but they can be opaque to ultraviolet light. In a particular example, sapphire wafers can be transparent to light wavelengths longer than 450 nm at typical CVD process temperatures (includes most of the visible light spectrum), but they can be opaque to light wavelengths equal to or shorter than 450 nm (includes the ultraviolet spectrum). One or more layers of gallium nitride deposited on wafers can be transparent to light wavelengths longer than 410 nm (includes most of the visible light spectrum), but they can be opaque to light wavelengths equal to or shorter than 410 nm (includes the ultraviolet spectrum). Other wafers 46, such as those made from silicon, can be transparent to light wavelengths longer than 1100 nm (includes part of the infrared spectrum), but they can be opaque to light wavelengths equal to or shorter than 1100 nm (includes the ultraviolet and visible light spectrums, and part of the infrared spectrum).

A heating element 50 is mounted within the chamber 12 and surrounds the spindle 30 below the fitting 36. The heating element 50 can transfer heat to the bottom surface of the support element 40, principally by radiant heat transfer. Heat applied to the bottom surface of the support element 40 can flow upwardly through the body of the support element to the top surface 41 thereof. Heat can pass upwardly to the bottom surface of each wafer 44 held by the support element 40, and upwardly through the wafers and to the top surfaces thereof. Heat can be radiated from the top surfaces of the wafers to the colder elements of the process chamber 12 as, for example, to the walls 20 of the process chamber and to the gas inlet manifold 14. Heat can also be transferred from the top surfaces of the wafers to the process gas passing over these surfaces.

In a particular embodiment, the heating element 50 can be a multi-zone heating element, whereby different portions of the support element 40 can be heated differently. In one example of such a multi-zone embodiment, a first annular portion 51 can be located at a position that includes a first radial distance D1 from the central axis 32 of the spindle 30, a second annular portion 53 can be located at a position that includes a second radial distance D2 from the central axis, and a third annular portion 55 can be located at a position that includes a third radial distance D3 from the central axis. Although a three-zone heating element 50 is shown in the Figures, in other embodiments, heating elements having other numbers of zones, such as one, two, four, five, six, eight, or ten can be used.

In an example embodiment, heat shields (not shown) can be provided below the heating element 50, for example, disposed parallel to the support element 40, to help direct heat from the heating element upwards towards the support element and not downwards towards the base plate 24 at the bottom end of the chamber 12.

The chamber 12 is also equipped with an exhaust system 52 arranged to remove spent gases from the interior region 26 of the chamber. The exhaust system 52 can include an exhaust manifold (not shown) at or near the bottom of the chamber 12. The exhaust manifold can be connected to a pump 56 or other vacuum source that can be configured to carry spent gasses out of the reaction chamber 12.

A plurality of optical viewports 60L and 60R (collectively the optical viewports 60) can be located at the top flange 22 of the chamber 12. Each viewport 60 can be adapted to receive a temperature measurement device (e.g., a pyrometer 70 or a temperature measurement device 80) for measuring temperature, or another non-contact measurement device such as a deflectometer for measuring curvature of the top surface of the wafers 46, a reflectometer for measuring growth rate of layers deposited on the top surface of the wafers, an ellipsometer, or a scanning device that can measure temperature across the entire radius of the support element 40. Each viewport 60 can be located at any radial distance from the central axis 32 of the spindle 30, and each viewport can be located at any angular location about the circumference of the top flange 22 of the chamber 12.

In the example embodiment shown in FIG. 1, there are seven viewports 60L at the left side of FIG. 1, including viewports 1L through 7L, each viewport 60L being located at a different radial distance from the central axis 32, and there are seven viewports 60R at the right side of FIG. 1, including viewports 1R through 7R, each viewport 60R being located at a different radial distance from the central axis 32. Each left-side viewport 1L through 7L is located at the same radial distance from the central axis 32 as the corresponding right-side viewport 1R through 7R. Although seven viewports 60L and 60R are shown in FIG. 1, in other embodiments, there can be any number of viewports 60L and 60R. For example, in a particular embodiment, there can be a single viewport 60L and a single viewport 60R. In another example, in the preferred embodiment shown in FIG. 2, there can be one or more radially-extensive viewports 60L', as described below.

A plurality of operating pyrometers 70 can be installed into corresponding ones of the plurality of viewports 60. Each operating pyrometer 70 can be adapted to measure the temperature of a portion of the support element 40 and/or portions of the top surfaces of wafers 46 on the support element by receiving radiation from a portion of the support element and/or from the top surfaces of the wafers at a particular radial distance from the rotational axis (e.g., the radial distance D1, D3, or D5). Such temperature measurements can be used as an input to a control system (e.g., a control system 90) to help determine the control of the heating element 50 during processing of the wafers.

In one example, each of the operating pyrometers 70 can be sensitive to radiation in a particular wavelength band, for example, light wavelengths shorter than or equal to 950 nm (includes part of the infrared spectrum). Therefore, in CVD process runs where the wafers 46 are transparent to the light frequency that can be detected by the operating pyrometers 70 (e.g., when sapphire wafers are processed), the operating pyrometers 70 can be used to measure the temperature of the top surface 41 of the wafer support element 40, and the temperature of the wafer support element can be used in a temperature-control feedback loop as a proxy for the temperature of the top surfaces of the wafers 46. Alternatively, in CVD process runs where the wafers 46 are opaque to the light frequency that can be detected by the operating pyrometers 70 (e.g., when silicon wafers are processed), the operating pyrometers 70 can be used to measure the temperature of the top surfaces of the wafers, so the temperature of the top surfaces of the wafers can be used in a temperature-control feedback loop.

In the example embodiments shown, there are three operating pyrometers 70 installed into three corresponding ones of the viewports 60R. For example, the operating pyrometers 70 include operating pyrometers 71, 73, and 75 installed into respective viewports 1R, 3R, and 5R. In other embodiments, there can be any number of operating pyrometers 70, and each operating pyrometer can be installed into any of the viewports 60.

As shown, each of the operating pyrometers 70 is oriented such that it can measure the temperature of the support element 40 and/or the top surfaces of the wafers 46 at a corresponding radial distance from the vertical rotational axis 42 of the support element. For example, each of the pyrometers 71, 73, and 75 can measure the temperature of the support element 40 and/or the top surfaces of the wafers 46 at a corresponding radial distance D1, D3, and D5 from the vertical rotational axis 42.

In a particular example, while the spindle 30 is rotating, the temperatures measured by each operating pyrometer 70 can be an average of the measured temperature of an entire annular portion of the support element 40 at a particular radial distance during at least one complete rotation of the support element, or such temperatures can be an average of the measured temperature of particular locations on the top surface 41 of the support element (e.g., locations between adjacent ones of the recesses 44) at the particular radial distance during at least one complete rotation of the support element.

In an example where the temperatures measured by each operating pyrometer 70 is an average of the measured temperature of more than one location at a particular radial distance, the control system 90 can analyze the temperature readings of each operating pyrometer and can separate the temperature data into: (i) temperature information received from portions of the top surface 41 of the support element 40, and (ii) temperature information received from the top surface of the wafers 46.

If, for a given operating pyrometer 70, it is desired to determine an average temperature of the top surface 41 of the support element 40 at a particular radial distance from the central axis 32 (e.g., when sapphire wafers 46 are being treated), the average of the temperature information received only from the top surface of the support element can be calculated. Alternatively, if it is desired to determine an average temperature of the top surfaces of the wafers 46 at a particular radial distance from the central axis 32 (e.g., when silicon wafers 46 are being treated), the average of the temperature information received only from the top surfaces of the wafers can be calculated.

In one example, in an embodiment where each operating pyrometer is used to help control a corresponding portion of a multi-zone heating element 50, each operating pyrometer 70 can be used to control the temperature of an annular portion of the support element 40 at a particular corresponding radial distance from the central axis 42.

For example, when the heating element 50 is a multi-zone heating element, each of the operating pyrometers 70 can control the heating of a portion of the heating element 50 that may be underlying a corresponding zone or portion of the support element 40. For example, a first operating pyrometer 71 can control the heating of a first annular portion 51 of the heating element 50 located at a position that includes the first radial distance D1 from the central axis 42, a second operating pyrometer 73 can control the heating of a second annular portion 53 of the heating element located at a position that includes the second radial distance D2 from the central axis, and a third operating pyrometer 75 can control the heating of a third annular portion 55 of the heating element 50 located at a position that includes a third radial distance D5 from the central axis.

In the embodiment shown in FIG. 1, a wafer temperature measurement device 80, for example, a short wavelength pyrometer or an absorption shift based device, can be removably or permanently installed into one or more of the viewports 60. In one embodiment, the wafer temperature measurement device 80 can be sensitive to radiation in a particular wavelength band, for example, light wavelengths shorter than or equal to 400 nm (includes the ultraviolet spectrum).

In a particular embodiment, a first operating pyrometer 71, 73, or 75 can be sensitive to radiation in a first wavelength band, the wafer temperature measurement device 80 can be sensitive to radiation in a second wavelength band, and the wafers 46 supported by the wafer support element 40 can be translucent or transparent to radiation in the first band and opaque to radiation in the second band. In an exemplary embodiment, the first wavelength band can be in the infrared light spectrum, and the second wavelength band can be in the ultraviolet light spectrum.

The wafer temperature measurement device 80 can be any type of temperature measurement device that can directly measure the temperature of a wafer 46 that is transparent to the operating pyrometers 70 (e.g., a sapphire wafer), or that can directly measure the temperature of a layer of material transparent to the operating pyrometers (e.g., a GaN layer) that is deposited on the top surface of a wafer that is opaque to the operating pyrometers (e.g., a silicon wafer).

For example, in the example where the wafers 46 consist essentially of sapphire, which at typical process temperatures (e.g., 700-900° C.) can be transparent to light wavelengths longer than 450 nm but can be opaque to light wavelengths equal to or shorter than 450 nm, a short wavelength pyrometer that is sensitive to light having wavelengths shorter than or equal to 400 nm can be used. In another example, an absorption shift based device that is sensitive to light having wavelengths shorter than or equal to 400 nm can be used. Such an absorption shift based device can receive radiation reflected off of the wafers 46 that is not absorbed by the wafers, and the temperature of the wafers can be determined by the longest wavelength of light that is reflected back to the absorption shift based device.

In another example, where the wafers 46 consist essentially of silicon, a layer of GaN may be deposited on the top surface of the wafers during a deposition process cycle. Such a layer of GaN can be transparent to light wavelengths longer than 410 nm but can be opaque to light wavelengths equal to or shorter than 410 nm, so a short wavelength pyrometer that is sensitive to light having wavelengths shorter than or equal to 400 nm can be used to measure the temperature of the GaN layer, rather than the temperature of the top surface of the wafer 46. In another example, an absorption shift based device that is sensitive to light having wavelengths shorter than or equal to 400 nm can be used. Such an absorption shift based device can receive radiation reflected off of the GaN layer that is not absorbed by the wafers, and the temperature of the GaN layer can be determined by the longest wavelength of light that is reflected back to the absorption shift based device.

In a particular example, the BandiT absorption shift based device, supplied by k-Space Associates Inc., may be used as the wafer temperature measurement device 80. In another example, a white light spectral reflectometer sensor device, which can record reflectivity of the top surfaces of the wafers 46 and the wafer support element 40 in a light wavelength range of approximately 250 nm to 1000 nm, for example, can be used as the wafer temperature measurement device 80.

In one embodiment, such a white light spectral reflectometer sensor device can divide the information from the radiation received into wavelength bands. For example, the information from the white light spectral reflectometer device can be divided into 10-nm wavelength bands between 250 nm and 1000 nm, and the information provided by these wavelength bands can be used for various process control purposes in addition to detection of the temperature of the top surfaces of the wafers 46 and the top surface 41 of the wafer support element 40.

The apparatus 10 according to the invention can improve the accuracy of the control of the temperature of the wafers 46 during a CVD process run, for example, by using the wafer temperature measurement device 80 to more accurately provide the offset between the temperatures of surfaces that are opaque to the operating pyrometers 70 (e.g., the top surface 41 of the support element 40 or the top surfaces of opaque wafers 46 such as silicon wafers) and the temperature of the top surfaces of the wafers that are transparent to the operating pyrometers (e.g., the top surfaces of transparent wafers 46 such as sapphire wafers or the top surface of a transparent GaN layer deposited on opaque wafers such as silicon wafers). If the temperature of the top surfaces of the wafers 46 that are transparent to the operating pyrometers is more accurately controlled, the wafers can be processed with a closer tolerance to the desired wafer layer deposition structure.

When processing wafers, for example, in a conventional CVD process, if the offset between the temperature of the top surface 41 of the wafer support element or the top surface of opaque wafers 46 (e.g., silicon wafers) recorded by the operating pyrometers and the temperature of the wafers is more accurately known due to the operation of the wafer temperature measurement devices 80, the temperature that is output by the process pyrometers can be used during a process run to more accurately estimate the temperature of the wafers. This estimated wafer temperature in each heating element zone can be used as an input to control the heating zones so that a more accurate desired wafer temperature is achieved.

In the apparatus 10, the offset between the temperature of the transparent top surface of the wafers 46 and the temperature of the top surface of the opaque support element 40 or the opaque wafers recorded by the operating pyrometers 70 can be more accurately determined by taking temperature measurements of the transparent top surface of the wafers during a CVD process run using the wafer temperature measurement device 80, which is adapted to directly measure the temperature of the transparent top surface of the wafers, rather than indirectly measuring the temperature of the wafers by measuring the temperature of the top surface of the support element or the top opaque surface of the wafers 46 (e.g., silicon wafers) using the operating pyrometers. In such an apparatus 10, the process temperature of the wafers can be more accurately controlled than with a conventional apparatus.

In a conventional CVD apparatus, the offset between the temperature of the top transparent surface of the wafers 46 and the temperature of the opaque support element 40 or opaque surface of a silicon wafer that is recorded by the operating pyrometers 70 during a CVD process run may not be known to a high accuracy. Several factors may make it difficult to know this temperature offset.

In one example, where sapphire wafers are being processed, an operating pyrometer 70 can be used that is sensitive to light wavelengths between approximately 912 and 925 nm. Such a sapphire wafer may be transparent to light having a wavelength greater than 450 nm, for example, so the operating pyrometer can't directly record the temperature of the top surface of the wafer 46. Instead, the operating pyrometer 70 can record the temperature of the top surface 41 of the support element 40, which is opaque to the operating pyrometer, and such temperature recordings of the support element at the same radius as the wafers 46 can be used as a proxy for the actual temperature of the top surfaces of the wafers, although with an offset adjustment, since the temperature of the top surface of the support element is not going to be exactly the same as the temperature of the top surface of the wafers.

In a particular embodiment, such an offset may be approximately 3° F. A control system 90 of a conventional CVD apparatus may include such a fixed offset estimate between the temperature recorded by the operating pyrometer 70 and the actual temperature of the top surface of the transparent wafer 46. However, this fixed offset estimate may be inaccurate, because during the process run, material such as GaN that is transparent to the operating pyrometers 70 can be deposited on the top surface 41 of the wafer support element 40, which can increasingly change the reflectivity and emissivity of the top surface of the wafer support element as the deposited GaN layer gets thicker during the process run. Such changes in reflectivity and emissivity of the top surface of the wafer support element can make the fixed offset estimate not representative of the actual offset between the temperature of the support element recorded by the operating pyrometer 70 and the actual temperature of the top surface of the transparent wafer 46.

However, in the apparatus 10, a wafer temperature measurement device 80 that is sensitive to light wavelengths between approximately 395 and 425 nm can directly record the temperature of the top surface of a transparent wafer 46 (e.g., a sapphire wafer), since light reflected off of the top surface of the wafer that is less than 450 nm, for example, will be able to be recognized by the wafer temperature measurement device. With such an apparatus 10, the offset between the temperature of the support element 40 recorded by the operating pyrometers 70 and the temperature of the top surface of the wafer 46 can be more accurately known at times in the process run where the temperature is stable for long enough (e.g., 1 minute) for the wafer temperature measurement device 80 to accurately detect the temperature of the top surface of the wafer.

Figure 3:
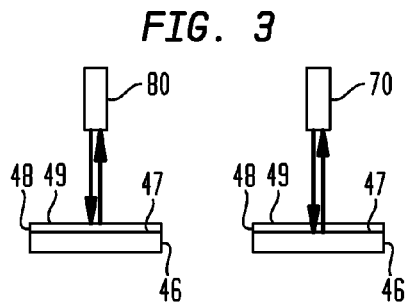
FIG. 3 is a sectional view depicting a support element bearing wafers in accordance with one embodiment of the invention.

In another example, illustrated in FIG. 3, where silicon or other opaque wafers are being processed, an operating pyrometer 70 can be used that is sensitive to light wavelengths between approximately 912 and 925 nm. Such a silicon wafer may be opaque to light having a wavelength less than 1100 nm, for example, so the operating pyrometer can directly record the temperature of the top surface 47 of the wafer 46. However, during the process run, material such as GaN that is transparent to the operating pyrometers 70 can be deposited on the top surface 47 of the wafer 46, thereby creating a transparent top surface 48 of a GaN layer 49.

Rather than directly recording the transparent top surface 48 of the deposited GaN layer 49, the operating pyrometer 70 can record the temperature of the top surface 47 of the wafer 46, which is opaque to the operating pyrometer, and such temperature recordings of the top surface 47 can be used as a proxy for the actual temperature of the top surface 48 of the GaN layer 49 deposited on the wafers, although with a fixed offset adjustment, since the temperature of the top surface 47 of the wafers 46 is not going to be exactly the same as the temperature of the top surface 48 of the GaN layer 49 deposited on the wafers.

As the deposition process continues and the GaN layer 49 gets thicker, this deposition can increasingly change the reflectivity and emissivity of the top surface 47 of the wafer 46 that is recorded by the operating pyrometer 70 during the process run. Such changes in reflectivity and emissivity of the top surface 47 of the wafer 46 can make the fixed offset estimate not representative of the actual offset between the temperature of the top surface 47 of the wafer 46 recorded by the operating pyrometer 70 and the actual temperature of the top surface 48 of the GaN layer 49 deposited on the wafers.

However, in the apparatus 10, a wafer temperature measurement device 80 that is sensitive to light wavelengths between approximately 395 and 425 nm can directly record the temperature of the top surface 48 of the GaN layer 49 deposited on the wafers, since light reflected off of the top surface 48 of the GaN layer 49 that is less than 410 nm will be able to be recognized by the wafer temperature measurement device. With such an apparatus 10, the offset between the temperature of the top surface 47 of the wafer 46 recorded by the operating pyrometers 70 and the temperature of the top surface 48 of the GaN layer 49 can be more accurately known at times in the process run where the temperature is stable for long enough (e.g., 1 minute) for the wafer temperature measurement device 80 to accurately detect the temperature of the top surface of the GaN layer.

Other factors may also affect the accuracy of the offset estimate between the temperature recorded by the operating pyrometers 70 and the temperature of the desired surface such as the top surface of a sapphire wafer or the top surface of a GaN layer overlying a silicon wafer, for example. One or more of the operating pyrometers 70 may be operating at one end or the other end of a tolerance of how accurately the operating pyrometers measure the temperature of a portion of the support element 40 or the top surface of an opaque wafer 46, so the temperature recorded may not equal the actual temperature of the surface the operating pyrometers 70 are trying to record. Also, the tolerance stack-up of the location of the components in a particular apparatus 10 relative to one another may result in variation of the location of the spindle 30, the support element 40, the cylindrical wall 20, and the gas inlet manifold 14, so those variations may affect the temperature relationship between the wafers 46 and the support element 40. In addition, even in a single CVD reactor, the warpage of the wafers 46 can vary from wafer to wafer and from process run to process run, so that during a particular process run, the temperature of the support element 40 that is recorded by the operating pyrometers 70 may not have an accurately known relationship with the temperature of the top surface of the wafers.

The wafer temperature measurement device 80 can be removably installed, in sequence, into three of the viewports 60L, including the viewports 1L, 3L, and 5L. As shown in FIG. 1, the wafer temperature measurement device 80 can be sequentially located in the positions A, B, and C, installed into the corresponding viewports 1L, 3L, and 5L. In a particular embodiment, a separate wafer temperature measurement device 80 can be permanently installed into each of the viewports 60L, including the viewports 1L, 3L, and 5L, or including the viewports 1L and 5L, where the temperature recorded by a temperature measurement device at the viewport 3L can be estimated by the data received by the devices at the viewports 1L and 5L.

When a wafer temperature measurement device 80 is located in the position A installed into the viewport 1L, the wafer temperature measurement device can measure the temperature of at least one wafer 46 at the radial distance D1 from the vertical rotational axis 42 of the support element 40. The at least one wafer 46 can be a single wafer, or it can be a plurality of wafers having portions located at the radial distance D1 from the vertical rotational axis 42.

This radial distance D1 is the same radial distance at which the operating pyrometer 71 installed into the viewport 1R is adapted to measure the temperature of the support element 40, or to measure the temperature of the top surface of an opaque wafer 46. Consequentially, while the spindle 30 is rotating, the operating pyrometer 71 installed in the viewport 1R can measure the temperature of a particular annular portion of the support element 40 (or the top surfaces of wafers 46) at the radial distance D1 and the wafer temperature measurement device 80 installed in the viewport 1L can measure the temperature of at least one wafer 46 at the same radial distance D1. Then, the relationship of the temperature of the support element 40 or the top surface of opaque wafers 46 at the radial distance D1 to the temperature of the wafers 46 recorded by the wafer temperature measurement device 80 at the same radial distance D1 can be determined for the particular process run or portion of a process run.

Similarly, when a wafer temperature measurement device 80 is located in the positions B or C installed into the respective viewports 3L or 5L, the wafer temperature measurement device can measure the temperature of at least one wafer 46 or the top surface of opaque wafers 46 at the respective radial distances D3 or D5 from the vertical rotational axis 42 of the support element 40. The radial distances D3 and D5 are the same radial distances at which the respective operating pyrometers 73 and 75 installed into the viewports 3R and 5R.

In one preferred embodiment, three wafer temperature measurement devices 80 can be installed in respective viewports 1L, 3L, and 5L (locations A, B, and C of FIG. 1), each temperature measurement device located at the same radius as a corresponding one of the operating pyrometers 70, which can be installed in respective viewports 1R, 3R, and 5R.

In another preferred embodiment, two wafer temperature measurement devices 80 can be installed in respective viewports 1L and 5L only (locations A and C of FIG. 1). In this embodiment, each of the wafer temperature measurement devices 80 can be installed at the same radius as a corresponding one of the operating pyrometers 70, which can be installed in respective viewports 1R, 3R, and 5R. However, since the operating pyrometer 73 at viewport 3R does not have a corresponding wafer temperature measurement device 80 at the same radius from the central axis 32, a weighted average of the information receive by the wafer temperature measurement devices at viewports 1L and 5L can be calculated so as to simulate the information received by a wafer temperature measurement device located at viewport 3L. Such a simulation of a wafer temperature measurement device located at viewport 3L is possible because there is a significant amount of crosstalk in the radiation reflected and emitted from each of the three temperature zones on the support element.

In one example, the temperatures measured by the temperature measurement device 80 can be an average of the measured temperature of particular locations on the top surfaces of all wafers at a particular radial distance (e.g., D1, D3, or D5) from the rotational axis 42 during at least one complete rotation of the support element. In a particular embodiment, during or after recording of the temperature of the wafers 46 by the temperature measurement device 80 at a particular radial distance from the rotational axis 42, the data can be processed so that the average temperature of a particular wafer at a particular circumferential location can be known. In such an embodiment, if the recorded temperature of one or more particular wafers 46 is substantially different than the temperature of the rest of the wafers such that it indicates that the particular wafer has been formed improperly, the temperature data of the improperly formed wafers can be excluded from the calculated relationship between the temperature of the wafers and the temperature of the wafer support element 40 recorded by the operating pyrometer 70 at that particular radial distance from the rotational axis 42.

A control system 90 can be provided that can be adapted to receive temperature measurement readings from the operating pyrometers 70 and the wafer temperature measurement device 80 during operation of the apparatus 10, and the control system can store such temperature measurement readings in a memory 92. In one embodiment, the control system 90 can adjust the heating of one or more zones or portions 51, 53, 55 of the heating element 50 in response to temperature measurements recorded by the corresponding operating pyrometers 71, 73, 75 and the wafer temperature measurement device 80.

In operation, in a temperature measurement process according to an embodiment of the invention, the wafer temperature measurement device 80 can be removably installed at the first position A engaged in the optical viewport 1L (or the wafer temperature measurement device can be permanently installed in a radially-extensive viewport and can be disposed at the first position A). While the wafer temperature measurement device 80 is disposed at the first position A, the wafer temperature measurement device is adapted to receive radiation from one or more wafers 46 having portions at a first radial distance D1 from the rotational axis 42 of the support element. As described above, a first operating pyrometer 71 can be installed at a first operating position engaged in the optical viewport 1R, such that the operating pyrometer 71 is adapted to receive radiation from a first portion of the support element 40 or the top surface of opaque wafers 46 at the first radial distance D1 from the rotational axis 42. In an exemplary embodiment, the operating pyrometers 71, 73, and 75 can remain installed in corresponding viewports 60R during the entire temperature measurement process (i.e., without being removed from the reactor 12).

Then, the reactor 12 can be heated by the heating element 50 until the reactor reaches a first typical wafer treatment temperature, for example, between 500 and 1100° C. In a preferred embodiment, the temperature measurement process using the wafer temperature measurement device 80 can be performed during treatment of the wafers 46 in the apparatus 10 (e.g., a chemical vapor deposition treatment), but that need not be the case.

Next, the support element 40 can be rotated about the rotational axis 42. In one embodiment, the support element 40 can be rotated at a speed between 50 and 1500 revolutions per minute, although in other embodiments, the support element can be rotated at other speeds. While the support element 40 is rotating about the rotational axis 42 thereof, an operator or the optional control system 90 can obtain first operating temperature measurements using the operating pyrometer 71 installed at the viewport 1R that receives radiation from a first portion of the support element (or from a top surface of a wafer that is opaque to the operating pyrometers), and the operator or the control system can obtain first wafer temperature measurements using the wafer temperature measurement device 80 installed at the viewport 1L (located at a first position A) that receives radiation from at least one wafer 46. In a preferred embodiment, the temperature measurements from the operating pyrometer 71 and the wafer temperature measurement device 80 located at the first position A can be obtained simultaneously.

As the support element 40 rotates, spots on the support element (or from a top surface of a wafer that is opaque to the operating pyrometers) disposed at the same radial distance D1 from the central axis 42 but at different angular locations around the axis pass the locations monitored by the first operating pyrometer 71, and spots on the at least one wafer 46 disposed at the same radial distance D1 from the central axis 42 but at different angular locations around the axis pass the locations monitored by the wafer temperature measurement device 80.

In the particular arrangement shown, the viewport 1L is offset by 180° or one-half of a revolution from the viewport 1R, and the locations monitored by the first operating pyrometer 71 and the wafer temperature measurement device 80 are likewise offset from one another by one-half of a revolution. Preferably, the temperature measurements are taken while the reaction chamber 12 is in a stable condition, so that the temperature is not changing over time or is oscillating within an acceptable tolerance of a desired temperature. Temperature differences between circumferentially separated locations on the support element 40 will not significantly affect temperature readings from the pyrometer 71 and the wafer temperature measurement device 80 because the temperature readings are averaged across several complete rotations of the support element.

In some embodiments, the wafer temperature measurement device 80 can record temperature more slowly than the operating pyrometers 70. One reason for this is that the wafer temperature measurement device 80 can be sensitive to radiation having wavelengths shorter than or equal to 400 nm compared to the operating pyrometers 70, which can be sensitive to radiation having wavelengths shorter than or equal to 950 nm. Typically, there is a much higher amount of energy being radiated from the wafer support element 40 (or wafers 46 that are opaque to the operating pyrometers 70) with wavelengths shorter than 950 nm than the energy being radiated from the wafers 46 with wavelengths shorter than 400 nm. Therefore, the operating pyrometers 70 can typically receive enough radiation to record a temperature in a shorter period of time than the wafer temperature measurement device 80. Consequently, in order to determine the offset between the temperature of the wafers 46 recorded by the temperature measurement device 80 and the temperature of the wafer support element 40 or the wafers 46 recorded by the operating pyrometers 70 at the same distance from the vertical rotational axis 42 during a particular wafer process run, it is preferred that the wafer temperature measurement device 80 measure the temperature of the wafers during a time period when the temperature of the reactor 12 is stable (i.e., being held at a single temperature within the performance tolerance of the heating element 50).

In a particular example, after the first wafer temperature measurements of the at least one wafer 46 has been recorded by the wafer temperature measurement device 80 and the first operating temperature measurements of a portion of the wafer support element or one or more wafers has been recorded by the first operating pyrometer 71, the temperature of the first zone or portion 51 of the heating element 50 can optionally be changed, at least partially based on the temperature information recorded by the wafer temperature measurement device and the first operating pyrometer.

Then, in embodiments using a single movable wafer temperature measurement device 80, the wafer temperature measurement device can be moved to or removably installed at the second position B engaged in the viewport 3L. In embodiments having a plurality of wafer measurement devices 80, it may not be necessary to remove any of the wafer measurement devices or to move any of such devices to another viewport. While the wafer temperature measurement device 80 is disposed at the second position B, the wafer temperature measurement device is adapted to receive radiation from one or more wafers 46 having portions at a second radial distance D3 from the rotational axis 42 of the support element. As described above, a second operating pyrometer 73 can be installed at a second operating position engaged in the viewport 3R, such that the operating pyrometer 73 is adapted to receive radiation from a second portion of the support element 40 or a second set of wafers or portions of wafers 46 at the second radial distance D3 from the rotational axis 42.

While the support element 40 is rotating about the rotational axis 42 thereof, the operator or the control system 90 can obtain second operating temperature measurements using the operating pyrometer 73 installed at the viewport 3R that receives radiation from the second portion of the support element or the second set of wafers or portions of wafers 46, and the operator or the control system can obtain second wafer temperature measurements using the wafer temperature measurement device 80 installed at the viewport 3L (located at a second position B) that receives radiation from at least one wafer 46. In a preferred embodiment, the temperature measurements from the operating pyrometer 73 and the wafer temperature measurement device 80 located at the second position B can be obtained simultaneously.

In a particular example, after the second wafer temperature measurements of the at least one wafer 46 has been recorded by the wafer temperature measurement device 80 and the second operating temperature measurements of a portion of the wafer support element or wafers has been recorded by the second operating pyrometer 73, the temperature of the second zone or portion 53 of the heating element 50 can optionally be changed, at least partially based on the temperature information recorded by the wafer temperature measurement device and the second operating pyrometer.

Then, in embodiments using a single movable wafer temperature measurement device 80, the wafer temperature measurement device can be moved to or removably installed at the third position C engaged in the viewport 5L. While the wafer temperature measurement device 80 is disposed at the third position C, the wafer temperature measurement device is adapted to receive radiation from one or more wafers 46 having portions at a third radial distance D5 from the rotational axis 42 of the support element. As described above, a third operating pyrometer 75 can be installed at a third operating position engaged in the viewport 5R, such that the operating pyrometer 75 is adapted to receive radiation from a third portion of the support element 40 or a third set of wafers or portions of wafers 46 at the third radial distance D5 from the rotational axis 42.

While the support element 40 is rotating about the rotational axis 42 thereof, the operator or the control system 90 can obtain third operating temperature measurements using the operating pyrometer 75 installed at the viewport 5R that receives radiation from the third portion of the support element or the third set of wafers or portions of wafers 46, and the operator or the control system can obtain third wafer temperature measurements using the wafer temperature measurement device 80 installed at the viewport 5L (located at a third position C) that receives radiation from at least one wafer 46. In a preferred embodiment, the temperature measurements from the operating pyrometer 75 and the wafer temperature measurement device 80 located at the third position C can be obtained simultaneously.

In a particular example, after the third wafer temperature measurements of the at least one wafer 46 has been recorded by the wafer temperature measurement device 80 and the third operating temperature measurements of a portion of the wafer support element or the third set of wafers or portions of wafers 46 has been recorded by the third operating pyrometer 75, the temperature of the third zone or portion 55 of the heating element 50 can optionally be changed, at least partially based on the temperature information recorded by the wafer temperature measurement device and the third operating pyrometer.

In a preferred embodiment, the first, second, and third operating and wafer temperature measurements can be collected from the operating pyrometers 71, 73, 75 and the temperature measurement device 80 while the reactor 12 is at a stable first typical wafer treatment temperature. In one example, each of the first, second, and third sets of operating and wafer temperature measurements can be collected for a period of one minute, such that three minutes of stable reactor temperature would be required for collection of the three sets of operating and wafer temperature measurements.

In a particular example, after the first, second, and third operating and wafer temperature measurements are collected, the temperature of the reactor 12 can then be changed to a second typical wafer treatment temperature, for example, between 500 and 1100° C., that is different than the first typical wafer treatment temperature. Once the temperature of the reactor 12 is stable, another set of first, second, and third operating and wafer temperature measurements can be collected from the operating pyrometers 71, 73, 75 and the temperature measurement device 80 sequentially moved to the positions A, B, and C. In a particular example, a first set of first, second, and third operating and wafer temperature measurements can be collected at a first wafer treatment temperature of approximately 1050° C., and a second set of first, second, and third operating and wafer temperature measurements can be collected at a second wafer treatment temperature of approximately 750° C. After all of the desired temperature measurements are obtained, the wafer temperature measurement device 80 can be removed from the chamber 12.

Although in the example described above, each set of first, second, and third operating and wafer temperature measurements is described as being collected while the reactor 12 is at a single typical wafer treatment temperature, in some embodiments, the first, second, and third operating and wafer temperature measurements can be collected while the reactor is at three different respective temperatures.

In one example, the operating pyrometers 70 and/or the wafer temperature measurement device 80 can have the ability to separate temperature data of each of a plurality of wafers 46 at the same distance from the vertical rotational axis 42 using differences in radiation received between times when the wafers pass underneath the operating pyrometers or the wafer temperature measurement device and times when portions of the first surface 41 of the wafer support element 40 pass underneath the wafer temperature measurement device. As described above, average temperatures of individual wafers 46 can be used to identify and exclude the temperature data of improperly formed wafers from the calculated relationship between the temperature of the wafers and the temperature of the wafer support element 40 recorded by the operating pyrometer 70 at that particular radial distance from the rotational axis 42.

In a preferred embodiment, the calibration parameters of the operating pyrometers 70 are not adjusted based on the temperature measurements obtained from the wafer temperature measurement device 80. Rather, the control system 90 can store in the memory 92 a mapping or look-up table of the offset of the temperature measurements obtained from the respective operating pyrometers 71, 73, and 75 with respect to the first, second, and third wafer temperature measurements obtained from the wafer temperature measurement device 80. In this way, the temperature mappings can allow the control system 90 to more accurately control the temperature of the wafers using the portions 51, 53, and 55 of the heating element 50, in response to process temperature measurements obtained the operating pyrometers 71, 73, and 75 during a wafer treatment process such as that described below.

In a preferred embodiment, the temperature measurement process described above can be performed during chemical vapor deposition operation of the reactor 12, as described below, while the reactor is in use processing wafers 46. Thus, the entry opening (not shown) can be opened by lowering a shutter (not shown). Then, a support element bearing the wafers 46 can be loaded from the antechamber (not shown) into the chamber 12 and can be placed in an operative position on the spindle 30. In this condition, the top surfaces of the wafers can face upwardly, towards the gas inlet manifold 14. Then, the entry opening can be closed. The heating element 50 can be actuated, and the rotary drive 38 can operate to turn the spindle 30 and hence the support element 40 around the central axis 32. Typically, the spindle is rotated at a rotational speed from about 50-1500 revolutions per minute.

Process gas supply units (not shown) can be actuated to supply gases through the gas inlet manifold 14. The gases can pass downwardly toward the support element 40, over the top surfaces of the wafers 46, and downwardly around a periphery of the support element to the exhaust system 52. Thus, the top surfaces of the wafers 46 can be exposed to a process gas including a mixture of the various gases supplied by the various process gas supply units. Most typically, the process gas at the top surface is predominantly composed of the carrier gas supplied by a carrier gas supply unit (not shown).

During the wafer treatment process, the operating pyrometers 70 can record temperature measurements that can serve as an input to control the heating element 50. In embodiments having a multi-zone heating element 50, each of a plurality of pyrometers 71, 73, and 75 can record temperature measurements at a particular radial distance from the vertical rotational axis 42 that can control a corresponding zone or portion 51, 53, 55 of the multi-zone heating element. As described above, a first set of first, second, and third operating and wafer temperature measurements can be collected at a first stable wafer treatment temperature and, if desired, a second set of first, second, and third operating and wafer temperature measurements can be collected at a second stable wafer treatment temperature.

The process can continue until the desired treatment of the wafers has been completed. Once the process has been completed, the entry opening can be opened, and the wafers 46 can be removed from the support element 40. Finally, the treated wafers can be replaced with new wafers for the next operational cycle.

Figure 4:
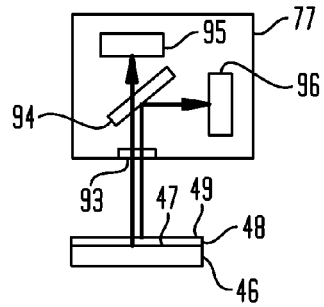
FIG. 4 is a sectional view depicting a dual-band temperature measurement device in accordance with one embodiment of the invention.

In the embodiments shown, the operating pyrometers and the wafer temperature measurement device 80 are separate devices installed in separate viewports. In a particular embodiment, as shown in FIG. 4, one or more of the operating pyrometers 70 and a corresponding wafer temperature measurement device 80 disposed at the same radius from the central axis 32 can be combined into a single device 77 that can perform the function of both the operating pyrometers 70 and the wafer temperature measurement device 80.

Such a single dual-band device 77 can have common radiation collection optics 93, but two separate radiation detection mechanisms 95 and 96. The collection optics can have a filter 94 disposed at an oblique angle to the central axis 32 that permits radiation in a first wavelength band of about 400 nm (e.g., 390-410 nm) to pass therethrough, but that reflects radiation in a second wavelength band of about 900 nm (e.g., 890-910 nm). The first band of radiation can be directed to a first radiation detection mechanism 95 that is sensitive to radiation in the first band, and the second band of radiation can be directed to a second radiation detection mechanism 96 that is be sensitive to radiation in the second band.

In the embodiments shown, the operating pyrometers 70 and the wafer temperature measurement device 80 are adapted to measure the temperature of the support element 40 and the wafers 46 supported thereon, at a radial distance from the vertical rotational axis 42 of the support element that is the same as the radial distance between the central axis 32 of the spindle 30 and the corresponding viewport 60, such that the operating pyrometers and the wafer temperature measurement device are adapted to receive radiation traveling at an angle α that is approximately a right angle (approximately 90°.

In other embodiments, the operating pyrometers 70 and the wafer temperature measurement device 80 can be adapted to measure the temperature of the support element 40 and the wafers 46 supported thereon, at a radial distance from the vertical rotational axis 42 of the support element that is different from the radial distance between the central axis 32 of the spindle 30 and the corresponding viewport 60, such that the operating pyrometers and the wafer temperature measurement device are adapted to receive radiation traveling at an angle α that is not approximately a right angle, such as 30°, 45°, 60°, 75°, or any other angle. In particular embodiments, either, both, or neither of the wafer temperature measurement device 80 and a corresponding pyrometer 70 may receive radiation traveling at an angle α that is approximately a right angle.

In such embodiments where the angle α is not approximately a right angle, the wafer temperature measurement device 80 can be located at a different radial distance from the vertical rotational axis 42 of the support element 40 than the corresponding operating pyrometer 70, so long as both the wafer temperature measurement device and the corresponding operating pyrometer can receive radiation traveling from the support element at the same radial distance (e.g., 1) from the vertical rotational axis.

As shown, the operating pyrometers 70 are installed into right-side viewports 60R, and the wafer temperature measurement device 80 can be removably installed into corresponding ones of the left-side viewports 60L. In other embodiments, each operating pyrometer 70 can be installed into any of the viewports 60, and the wafer temperature measurement device 80 can be removably installed into any corresponding one of the viewports 60 that can receive radiation traveling from the support element at the same radial distance from the vertical rotational axis 42 as that received by the respective operating pyrometer 70.

In one example, the operating pyrometers 70 can be installed into some of the left-side viewports 60L, and the wafer temperature measurement device 80 can be removably installed into corresponding ones of the right-side viewports 60R. In another example, some of the operating pyrometers 70 (e.g., the operating pyrometers 71 and 73) can be installed into some of the right-side viewports 60R, and others of the operating pyrometers (e.g., the operating pyrometer 75) can be installed into left-side viewports 60L, and the wafer temperature measurement device 80 can be removably installed into corresponding ones of the viewports 60 that can receive radiation traveling from the support element at the same radial distance from the vertical rotational axis 42 as that received by the respective operating pyrometer 70.

It is desirable that each of the viewports 60 into which the wafer temperature measurement device 80 will be installed (e.g., the left-side viewports 1L, 3L, and 5L) is free of significant parasitic deposition thereon. Before the wafer temperature measurement device 80 is installed into a particular viewport 60, it is desirable that the particular viewport be cleaned to remove such parasitic deposition.

Figure 2:
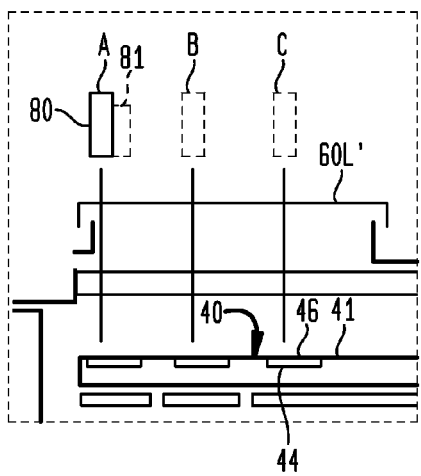
FIG. 2 is a partial sectional view depicting an alternate viewport embodiment for the chemical vapor deposition apparatus shown in FIG. 1.

Referring now to FIG. 2, a preferred viewport embodiment for the chemical vapor deposition apparatus 10 shown in FIG. 1 is shown. In this embodiment, the wafer temperature measurement device 80 can be removably or permanently installed into one or more radially-extensive optical viewports 60L', rather than being sequentially removably installed into separate viewports 1L, 3L, and 5L. As used herein, a radially-extensive viewport is a viewport that has the capability of changing the radial position of an installed pyrometer relative to the central axis 32 of the spindle 30 without removing the pyrometer from the viewport. Such a radially-extensive viewport can include a linear slide having radially-extending rails that allow a pyrometer to slide thereon from one radial position to another without removal from the viewport.

In the embodiment shown in FIG. 2, the wafer temperature measurement device 80 can be installed into a radially-extensive viewport 60L' on rails (not shown) extending substantially parallel to the top surface 41 of the support element 40 along at least a portion of a radius of the support element, such that the wafer temperature measurement device can be controlled using a micrometer mount. In one example, the wafer temperature measurement device 80 can be quickly moved on the rails along at least a portion of the radius of the support element 40 to form a map of temperature measurement recording of a radially-extensive portion of the support element. In another example, the radially-extensive viewport 60L' can extend along an entire radius of the support element, such that the wafer temperature measurement device 80 can be moved on the rails along an entire radius of the support element 40 to perform temperature measurement recordings of any radial location on the top surface 41 of the support element.

In a particular embodiment, there can be two or more radially-extensive viewports 60L' along the same radius of the support element 40 or along different radii at different angular locations of the support element, and the wafer temperature measurement device 80 can be sequentially installed into each radially-extensive viewport for recording of temperature measurements along two or more radially-extensive portions of the support element.

In a preferred example, the wafer temperature measurement device 80 can be moved within the radially-extensive viewport 60L' along the rails to the discrete locations A, B, and C, such that the wafer temperature measurement device can measure the temperature of wafers 46 having portions located at the radial distances D1, D3, and D5 at which the respective operating pyrometers 71, 73, and 75 are adapted to record temperature measurements.

The wafer temperature measurement device 80 may be removably installed in the viewport 60L' only at times during which a user desires to determine the relationship between the temperature of wafers 46 in the reactor 12 and the temperature of the wafer support element 40 recorded by the operating pyrometers 70, or the wafer temperature measurement device can remain installed in the viewport 60L' during wafer treatment cycles and can be periodically removed for re-calibration against a known standard.

In one variation of the embodiment of FIG. 2, the wafer temperature measurement device 80 that is installed into a radially-extensive viewport 60L' on rails extending substantially parallel to the top surface 41 of the support element 40 can include an optional mechanism 81 for measuring reflectivity and wafer curvature information (shown in dashed lines in FIG. 2). In one example, the mechanism 81 can be joined to the wafer temperature measurement device 80, and can slide along the radially-extensive viewport therewith. In one embodiment, the mechanism 81 can be sensitive to light in the same wavelength band as the wafer temperature measurement device 80, such as 395-425 nm, for example.

When the mechanism 81 is included with the wafer temperature measurement device 80, additional information can be collected by the mechanism 81 while the temperature measurement device is recording the temperature of the top surface of the wafers 46. For example, the mechanism 81 can record 2D and 3D wafer uniformity maps of curvature, temperature, reflectivity, concentration of materials deposited on the wafers, and growth rate of materials deposited on the wafers. Such additional information recorded by the mechanism 81 during a CVD process run can be monitored and used as a feedback to the control system 90 for controlling temperature (controlling the heaters 50) and/or gas delivery system concentration and/or flow (controlling the gas inlet manifold 14).

In another variation of the embodiment of FIG. 1 or 2, a thermistor can be installed on the bodies of the operating pyrometers 70 and/or the wafer temperature measurement devices 80 to monitor the ambient temperature of the pyrometers during CVD process runs, and the temperature output readings of the operating pyrometers and/or the wafer temperature measurement devices can be adjusted based on the profile of the ambient temperature measurements.

This variation can permit more accurate temperature control of the CVD process, because the accuracy of the temperature output of the operating pyrometers 70 and/or the wafer temperature measurement devices 80 may vary, depending on the ambient temperature of the operating pyrometers and/or the wafer temperature measurement devices. If the effect of ambient temperature on the accuracy of the temperature output of the operating pyrometers 70 and/or the wafer temperature measurement devices 80 is known, using temperature information recorded by such thermistors during a CVD process run within a process control feedback loop can permit the control system 90 to know the temperature offset of the operating pyrometers 70 and/or the wafer temperature measurement devices 80 from the actual temperature of the wafers 46 during different stages of the CVD process run, and the control system can use this offset information to more accurately control the temperature of the wafers during the process run.

The operating pyrometers 70 and the wafer temperature measurement device 80 can each be removed from the chamber 12 and periodically calibrated against a known standard as, for example, a standard device that itself is traceable to a national or international standard such as a NIST-traceable black-body standard. In a particular example, the operating pyrometers 70 can be calibrated using an in-situ system as shown and descried in the co-pending and co-owned U.S. patent application Ser. No. 13/331,112, which is hereby incorporated by reference herein.

In one embodiment that is a variation of the in-situ system of the '112 application, the operating pyrometers 70 and the temperature measurement device 80 can each be calibrated using a two-part in-situ calibration process, as described below.

In a first part of the calibration process, one or more of the operating pyrometers 70 can be calibrated by removing the temperature measurement device 80 from the reactor 10, and removably installing a calibrating pyrometer into one of the viewports 60 at the same radius from the vertical rotational axis 42 of the support element as one or more of the operating pyrometers. For example, to calibrate the operating pyrometer 71 installed in viewport 1R, the calibration pyrometer can be installed into viewport 1L. In a particular example, the calibrating pyrometer can be a high accuracy pyrometer. For example, such a calibrating pyrometer can have accuracy within approximately ±1.5° C. and repeatability from one calibrating pyrometer to another within approximately ±0.25° C.

When the calibrating pyrometer is located in the position A installed into the viewport 1L, the calibrating pyrometer can measure the temperature of the support element 40 or the temperature of one or more wafers that are opaque to both the calibrating and operating pyrometers (e.g., silicon wafers) at the radial distance D1 from the vertical rotational axis 42 of the support element. This radial distance D1 is the same radial distance at which the operating pyrometer 71 installed into the viewport 1R is adapted to measure the temperature of the support element 40 or opaque wafers 46. Consequentially, while the spindle 30 is rotating, the calibrating pyrometer installed in the viewport 1L and the operating pyrometer 71 installed in the viewport 1R can measure the temperature of a particular annular portion of the support element 40 at the radial distance D1, and such measured temperatures can be averages of the measured temperature of the entire annular portion during at least one complete rotation of the support element. Based on the temperature measurement information collected by the calibrating pyrometer and the operating pyrometer 71, the operating pyrometer can be calibrated, or the temperature offset between the calibrating pyrometer and the operating pyrometer can be recorded by the control system 90.

Similarly, when the calibrating pyrometer is located in the positions B or C installed into the respective viewports 3L or 5L, the calibrating pyrometer can measure the temperature of the support element 40 at the respective radial distances D3 or D5 from the vertical rotational axis 42 of the support element. The radial distances D3 and D5 are the same radial distances at which the respective operating pyrometers 73 and 75 installed into the viewports 3R and 5R are adapted to measure the temperature of the support element 40. Therefore, based on temperature measurement information collected by the calibrating pyrometer and the operating pyrometers 73 and 75, the operating pyrometers can be calibrated, or the temperature offset between the calibrating pyrometer and the operating pyrometers can be recorded by the control system 90.

If desired, the first part of the calibration process can be repeated with the reactor 10 heated to a series of other temperatures (e.g., 800° C., 900° C., 1000° C., and 1100° C.), so that the temperature offset between the calibrating pyrometer and the operating pyrometers 70 can be recorded across the temperature range used in a typical CVD process.

In a second part of the calibration process, the wafer temperature measurement device 80 can be re-installed into the reactor 10 into one of the viewports 60L at the same radius from the vertical rotational axis 42 of the support element from one of the already-calibrated operating pyrometers 70. Since the operating pyrometers 70 have already been calibrated by the calibrating pyrometer, using one of the operating pyrometers to calibrate the temperature measurement device 80 can have the same accuracy of calibration as using the calibrating pyrometer itself, but with the advantage of not having to remove the operating pyrometers from the reactor 10, and with the advantage of not having to send the temperature measurement device 80 off-site to be calibrated in a separate apparatus.

For example, to calibrate the wafer temperature measurement device 80 using the operating pyrometer 71 installed in viewport 1R as a calibration pyrometer, the wafer temperature measurement device can be installed into viewport 1L at location A. Then, a blank wafer support element having no pockets 44, an empty wafer support element 40, or a wafer support element 40 bearing silicon wafers 46 thereon (or any wafers that are opaque to both the wafer temperature measurement device 80 using the operating pyrometer 71) can be installed in the reactor 10.

The reactor 10 can be heated to a first temperature (e.g., 700° C.), and while the spindle 30 is rotating, the temperature measurement device 80 installed in the viewport 1L and the operating pyrometer 71 installed in the viewport 1R can measure the temperature of a particular annular portion of the support element 40 and/or the opaque wafers 46 at the radial distance D1, and such measured temperatures can be averages of the measured temperature of the entire annular portion during at least one complete rotation of the support element. Based on the temperature measurement information collected by the operating pyrometer 71 and the temperature measurement device 80, the temperature measurement device can be calibrated, or the temperature offset between the temperature measurement device and the operating pyrometer can be recorded by the control system 90.

If desired, the second part of the calibration process can be repeated with the reactor 10 heated to a series of other temperatures (e.g., 800° C., 900° C., 1000° C., and 1100° C.), so that the temperature offset between the wafer temperature measurement device and the operating pyrometer 71 can be recorded across the temperature range used in a typical CVD process.

The in-situ temperature measurement systems and methods according to the invention, as described above, can have several potential advantages compared to conventional temperature measurement methods. For example, compared to conventional temperature measurement processes, the temperature measurement process according to the invention can compensate for errors related to operating pyrometer installation in the chamber 12 and conditions in the chamber such as parasitic deposition on the viewports 60, as described above.

The invention can be applied in various wafer treatment processes using a rotating disc reactor as, for example, chemical vapor deposition, chemical etching of wafers, and the like. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. It will be appreciated that the various dependent claims and the features set forth therein can be combined in different ways than presented in the initial claims. It will also be appreciated that the features described in connection with individual embodiments may be shared with others of the described embodiments.

The invention claimed is:

1. A method of in-situ temperature measurement for a wafer treatment reactor, comprising:
   (a) heating the reactor until the reactor reaches a wafer treatment temperature;
   (b) rotating a wafer support element within the reactor about a rotational axis;
   (c) while the wafer support element is rotating about the rotational axis, obtaining first operating temperature measurements using a first operating pyrometer that receives radiation from a first portion of the wafer support element; and
   (d) while the wafer support element is rotating about the rotational axis, obtaining first wafer temperature measurements using a wafer temperature measurement device that receives radiation from at least one wafer, the wafer temperature measurement device located at a first position,
   wherein the first operating pyrometer is sensitive to radiation in a first wavelength band, the wafer temperature measurement device is sensitive to radiation in a second wavelength band, and the at least one wafer is translucent or transparent to radiation in the first band and opaque to radiation in the second band.

2. The method as claimed in claim 1, wherein the first portion of the wafer support element is located at a first radial distance from the rotational axis, and wherein during step (d), the radiation received from the at least one wafer is received from locations at the first radial distance from the rotational axis.

3. The method as claimed in claim 2, wherein the heating step is performed by a multi-zone heating system for the wafer support element, a first zone of the heating system having a portion thereof located at the first radial distance from the rotational axis, the method further comprising:
   (e) changing the temperature of the first zone.

4. The method as claimed in claim 3, further comprising:
(f) moving the wafer temperature measurement device to a second position;
(g) while the wafer support element is rotating about the rotational axis, obtaining second operating temperature measurements using a second operating pyrometer that receives radiation from a second portion of the wafer support element; and
(h) while the wafer support element is rotating about the rotational axis, obtaining second wafer temperature measurements using the wafer temperature measurement device, the second wafer temperature measurements being at least partially based on radiation received from the at least one wafer.

5. The method as claimed in claim 4, wherein the second portion of the wafer support element is located at a second radial distance from the rotational axis, and wherein during step (h), the radiation received from the at least one wafer is received from locations at the second radial distance from the rotational axis.

6. The method as claimed in claim 5, wherein a second zone of the heating system has a portion thereof located at the second radial distance from the rotational axis, the method further comprising:
(i) changing the temperature of the second zone.

7. The method as claimed in claim 5, wherein the wafer temperature measurement device is engaged in a radially-extensive optical viewport, and the moving step is performed such that the wafer temperature measurement device is moved along the radially-extensive calibrating optical viewport from the first position to the second position.

8. The method as claimed in claim 7, wherein the moving step is performed such that the wafer temperature measurement device is moved along a linear slide.

9. The method as claimed in claim 4, wherein the first wafer temperature measurements are at least partially based on radiation received from a first wafer of the at least one wafer, and the second wafer temperature measurements are at least partially based on radiation received from a second wafer of the at least one wafer.

10. The method as claimed in claim 1, wherein the wafer temperature measurement device is a short wavelength pyrometer.

11. The method as claimed in claim 1, wherein the wafer temperature measurement device is one of: an absorption shift based device or a white light spectral reflectometer.

12. The method as claimed in claim 1, wherein the first wavelength band is in the infrared light spectrum, and the second wavelength band is in the ultraviolet light spectrum.

13. The method as claimed in claim 1, wherein the at least one wafer consists essentially of sapphire.

14. The method as claimed in claim 1, wherein the at least one wafer is a plurality of wafers.

15. The method as claimed in claim 1, wherein steps (c) and (d) are performed simultaneously.

16. The method as claimed in claim 1, wherein steps (c) and (d) are performed during operation of the reactor to treat wafers.

17. The method as claimed in claim 1, wherein the operation of the reactor to treat wafers includes chemical vapor deposition.

18. The method as claimed in claim 1, wherein the wafer treatment temperature is a first wafer treatment temperature, further comprising:
(e) heating the reactor until the reactor reaches a second wafer treatment temperature;
(f) while the wafer support element is rotating about the rotational axis, obtaining second operating temperature measurements from the first portion of the wafer support element using the first operating pyrometer; and
(g) while the wafer support element is rotating about the rotational axis, obtaining second wafer temperature measurements from the at least one wafer using the wafer temperature measurement device.

19. A method of in-situ temperature measurement for a wafer treatment reactor, comprising:
(a) heating the reactor until the reactor reaches a wafer treatment temperature;
(b) rotating a wafer support element bearing at least one wafer within the reactor about a rotational axis; and
(c) depositing a material overlying the top surface of the at least one wafer, the material forming a layer having a top surface thereof;
(d) while the wafer support element is rotating about the rotational axis, obtaining first operating temperature measurements using a first operating pyrometer sensitive to radiation in a first wavelength band, the first operating pyrometer receiving radiation from the top surface of at least one wafer, the at least one wafer being opaque to radiation in the first band, the layer overlying the top surface of the at least one wafer being translucent or transparent to radiation in the first band; and
(e) while the wafer support element is rotating about the rotational axis, obtaining first wafer temperature measurements using a wafer temperature measurement device sensitive to radiation in a second wavelength band, the wafer temperature measurement device receiving radiation from the top surface of the layer overlying the top surface of the at least one wafer, the at least one wafer being opaque to radiation in the second band, the layer overlying the top surface of the at least one wafer being opaque to radiation in the second band, the wafer temperature measurement device located at a first position.

20. A method of in-situ wafer temperature measurement device calibration for a wafer treatment reactor, comprising:
(a) positioning a calibrating pyrometer at a calibrating position so that the calibrating pyrometer is adapted to receive radiation from a portion of a first wafer support element at a first radial distance from a rotational axis of the first wafer support element;
(b) heating the reactor until the reactor reaches a pyrometer calibration temperature;
(c) rotating the first wafer support element about the rotational axis;
(d) while the first wafer support element is rotating about the rotational axis, obtaining first operating temperature measurements from an operating pyrometer installed at an operating position so that the operating pyrometer is adapted to receive radiation from the portion of the first wafer support element at the first radial distance from the rotational axis of the first wafer support element;
(e) while the support element is rotating about the rotational axis, obtaining first calibrating temperature measurements from the calibration pyrometer;
(f) removing the calibrating pyrometer from the calibrating position;
(g) replacing the first wafer support element with a second wafer support element bearing at least one wafer thereon, the at least one wafer being opaque to the operating pyrometer and the wafer temperature measurement device;

(h) positioning the wafer temperature measurement device at the calibrating position so that the wafer temperature measurement device is adapted to receive radiation from the at least one wafer at the first radial distance from the rotational axis of the second wafer support element;
(i) rotating the second wafer support element about the rotational axis;
(k) while the second support element is rotating about the rotational axis, obtaining second operating temperature measurements from the wafer temperature measurement device, the second operating temperature measurements including a temperature of a top surface of the at least one wafer;
(j) while the second wafer support element is rotating about the rotational axis, obtaining second calibrating temperature measurements from the first operating pyrometer, the second calibrating temperature measurements including a temperature of the top surface of the at least one wafer.

* * * * *